April 1, 1952 H. S. JOHNS ET AL 2,591,265

BOWLING ALLEY SWEEPER MECHANISM

Filed Dec. 27, 1944 9 Sheets-Sheet 1

INVENTORS
Henry S. Johns
BY William H. Johns
Hull & West
ATTORNEYS

April 1, 1952 H. S. JOHNS ET AL 2,591,265

BOWLING ALLEY SWEEPER MECHANISM

Filed Dec. 27, 1944 9 Sheets-Sheet 2

INVENTORS
Henry S. Johns
William H. Johns
BY
Hull & West.
ATTORNEYS

BOWLING ALLEY SWEEPER MECHANISM
Filed Dec. 27, 1944
9 Sheets-Sheet 3
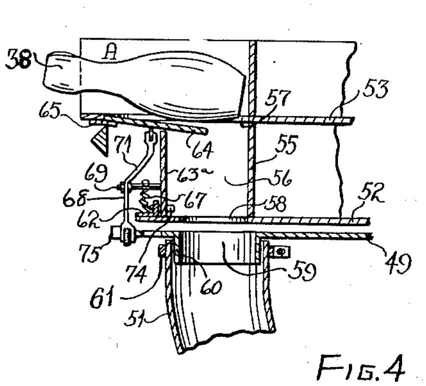
FIG. 4
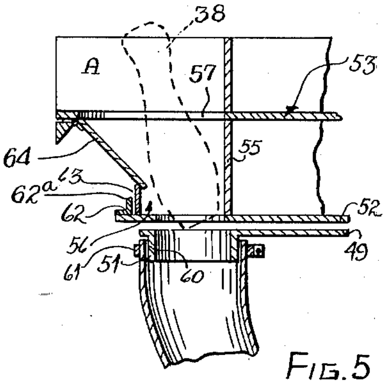
FIG. 5
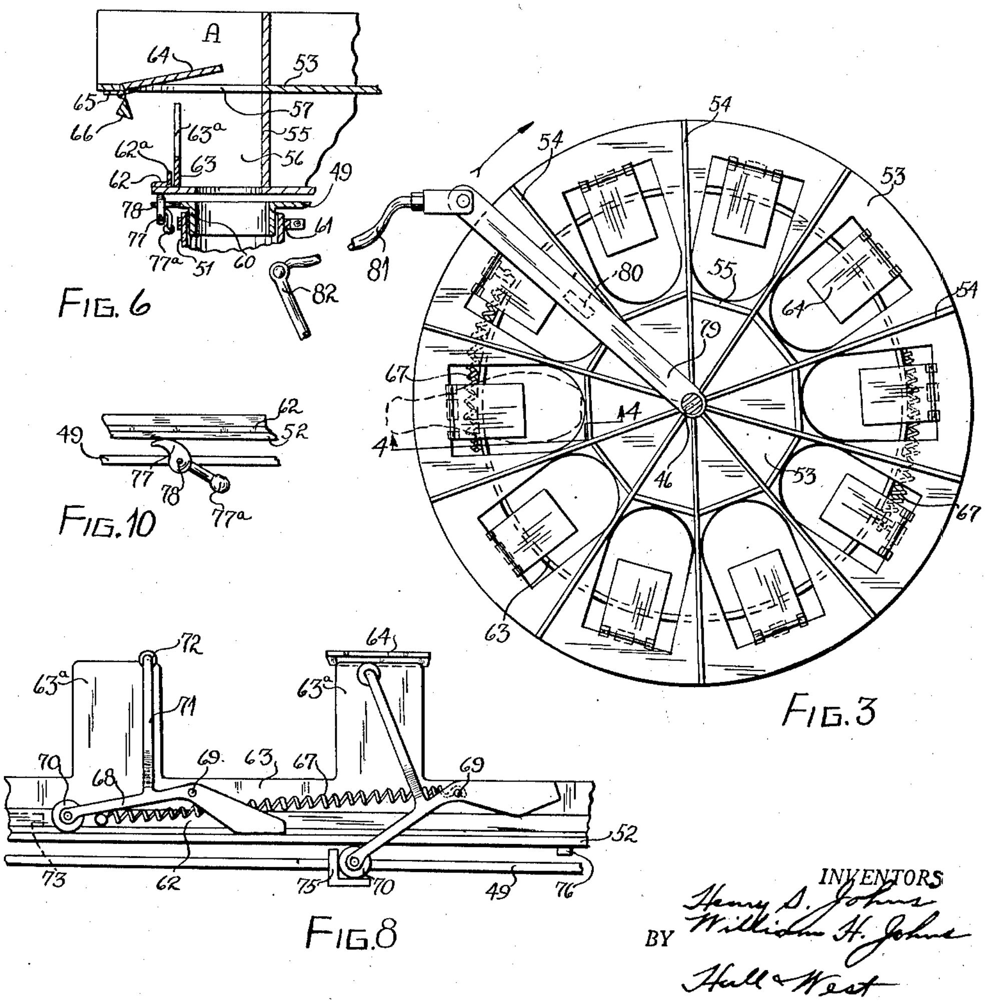
FIG. 6, FIG. 10, FIG. 3
FIG. 8
INVENTORS
BY Henry S. Johns
William H. Johns
Hull & West
ATTORNEYS April 1, 1952 H. S. JOHNS ET AL 2,591,265

BOWLING ALLEY SWEEPER MECHANISM

Filed Dec. 27, 1944 9 Sheets-Sheet 4

INVENTORS,
BY Henry S. Johns
William H. Johns
By Hull & West.
ATTORNEYS

BOWLING ALLEY SWEEPER MECHANISM

Filed Dec. 27, 1944 9 Sheets-Sheet 5

INVENTORS
Henry S. Johns
William H. Johns
BY Hull & West
ATTORNEYS

BOWLING ALLEY SWEEPER MECHANISM

Filed Dec. 27, 1944 9 Sheets-Sheet 6

INVENTORS
Henry A. Johns
William H. Johns
BY
Hull & West.
ATTORNEYS

BOWLING ALLEY SWEEPER MECHANISM

Filed Dec. 27, 1944 9 Sheets-Sheet 7

INVENTORS
Henry S. Johns
William H. Johns
BY Hull & West
ATTORNEYS

INVENTORS,
Henry S. Johns
BY William H. Johns
Hull & West
ATTORNEYS

INVENTORS
Henry S. Johns
BY William H. Johns
Hull & West.
ATTORNEYS

Patented Apr. 1, 1952 2,591,265

UNITED STATES PATENT OFFICE 2,591,265

BOWLING ALLEY SWEEPER MECHANISM

Henry S. Johns and William H. Johns,
Cleveland Heights, Ohio

Application December 27, 1944, Serial No. 569,962

8 Claims. (Cl. 273—54)

This invention relates to automatic pin setting apparatus or systems for use in bowling alleys and has for its general object to provide simple, economical and novel means for effecting the operation of sweeping from the alley the "dead wood" arising from the bowling of one or two balls.

Figure 1:
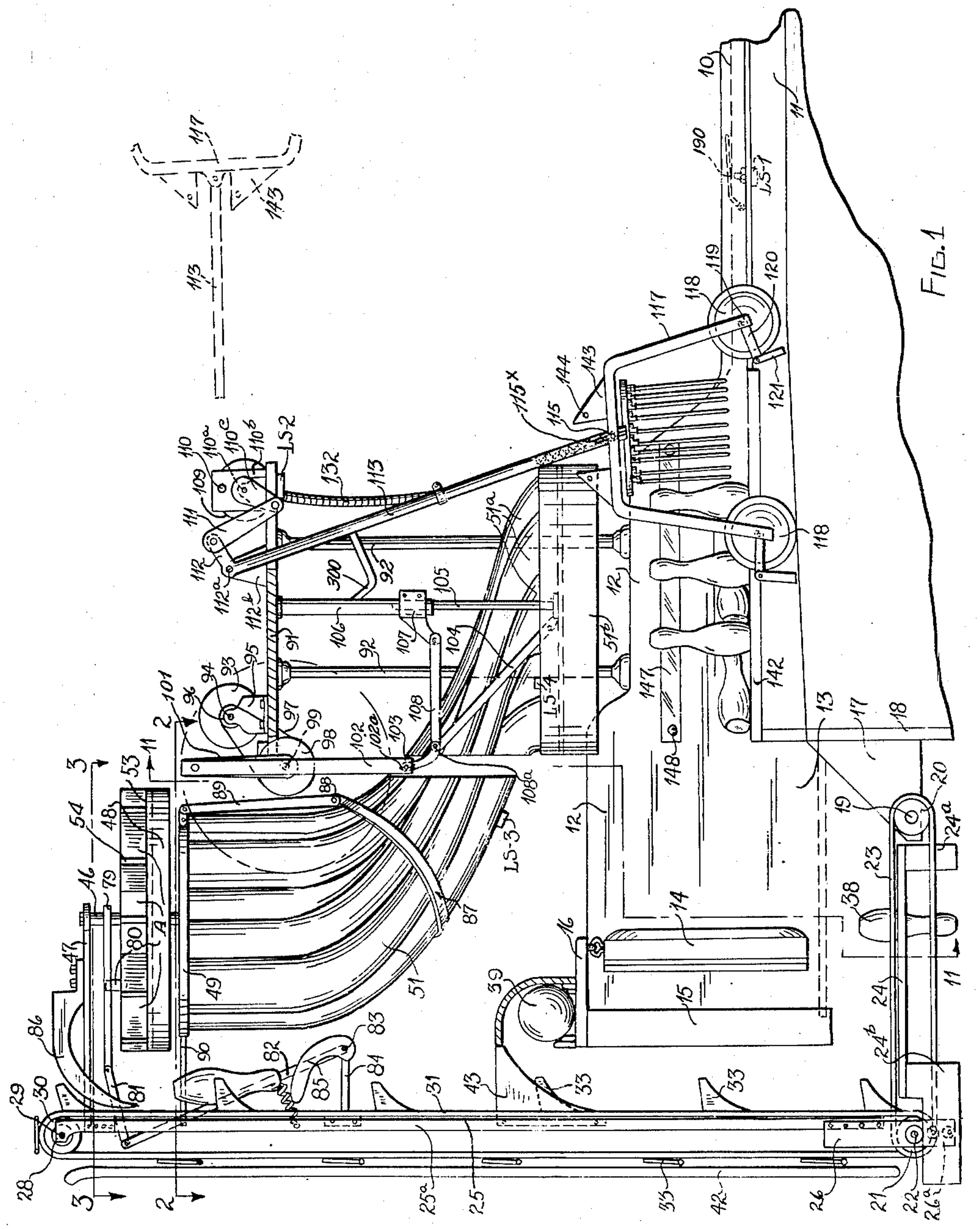
Figures 2, 27:
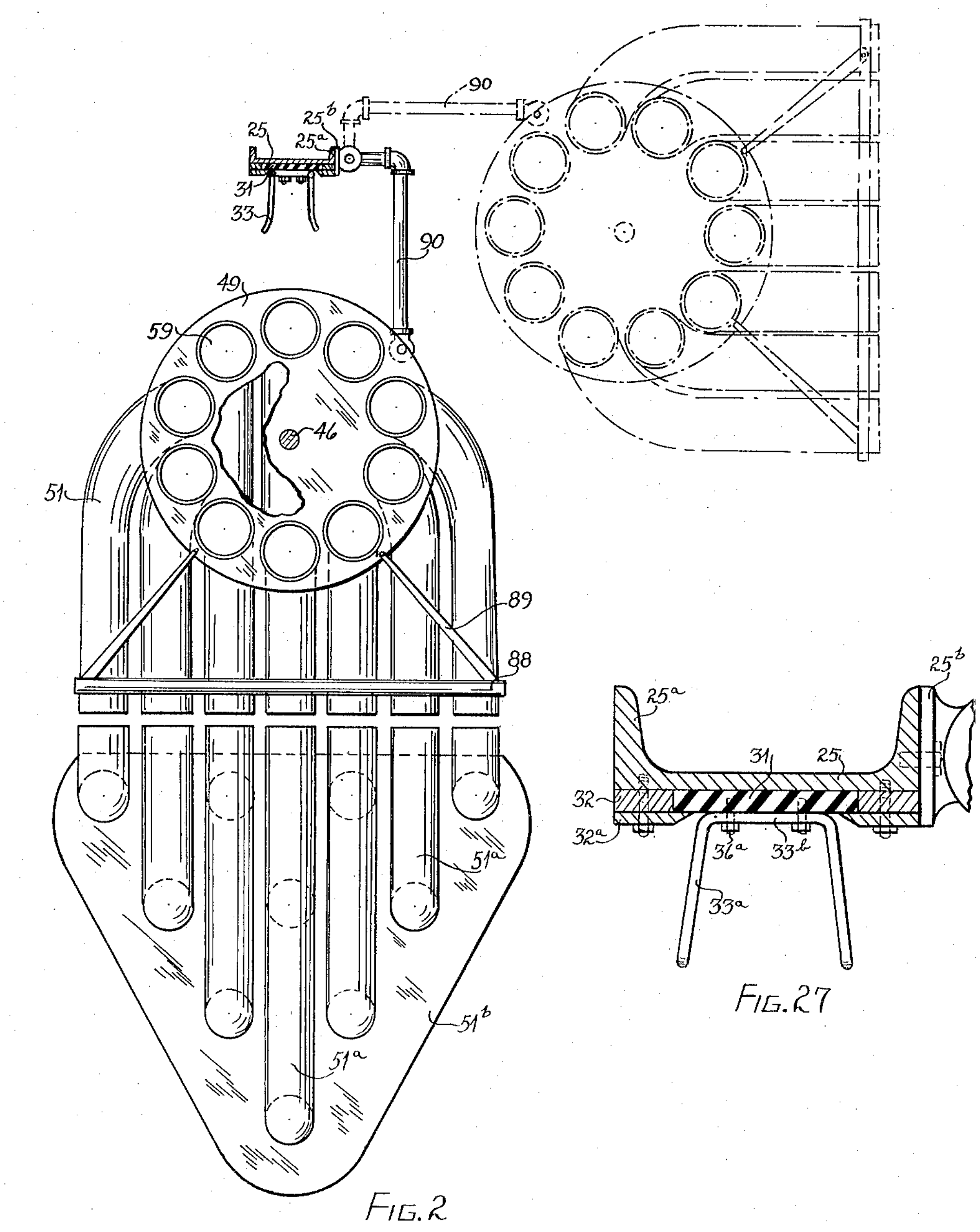
Figure 15:
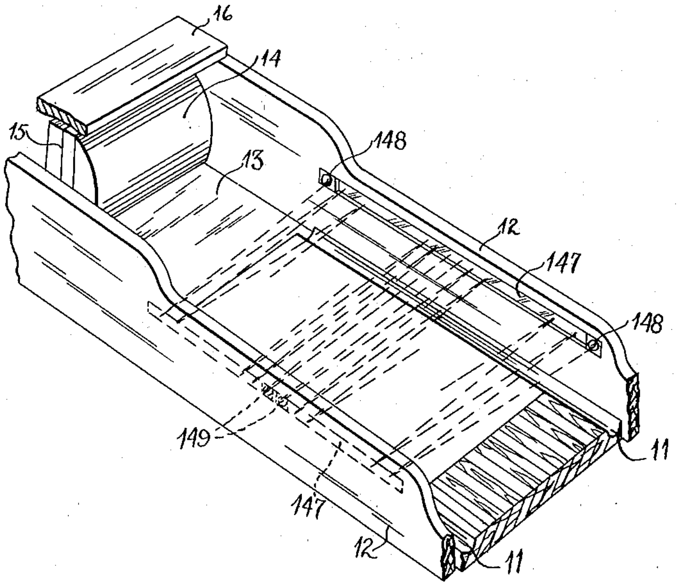
Figure 16:
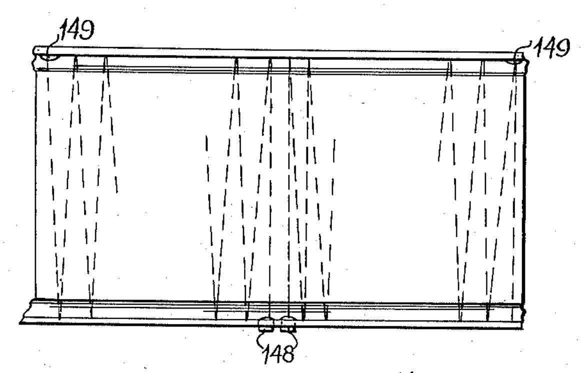
Figures 7, 9:
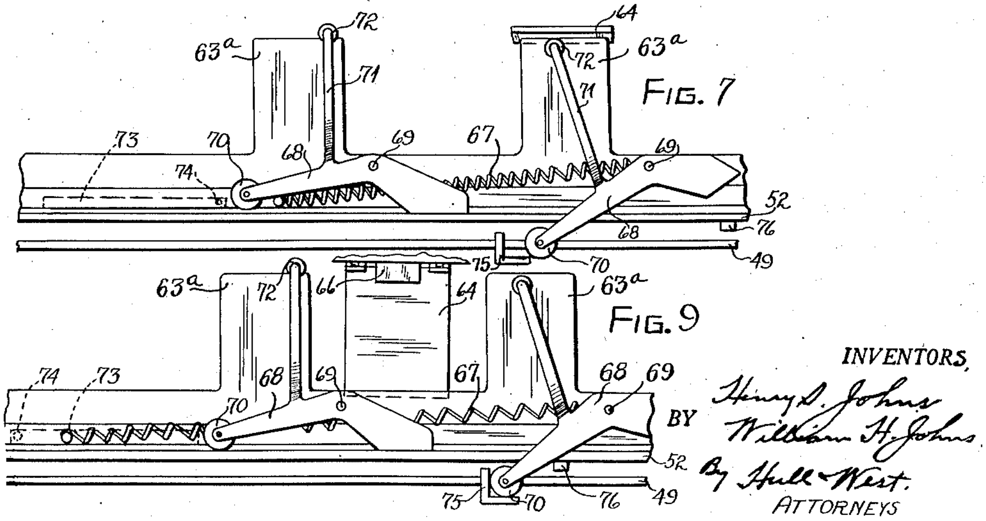
Figure 11:
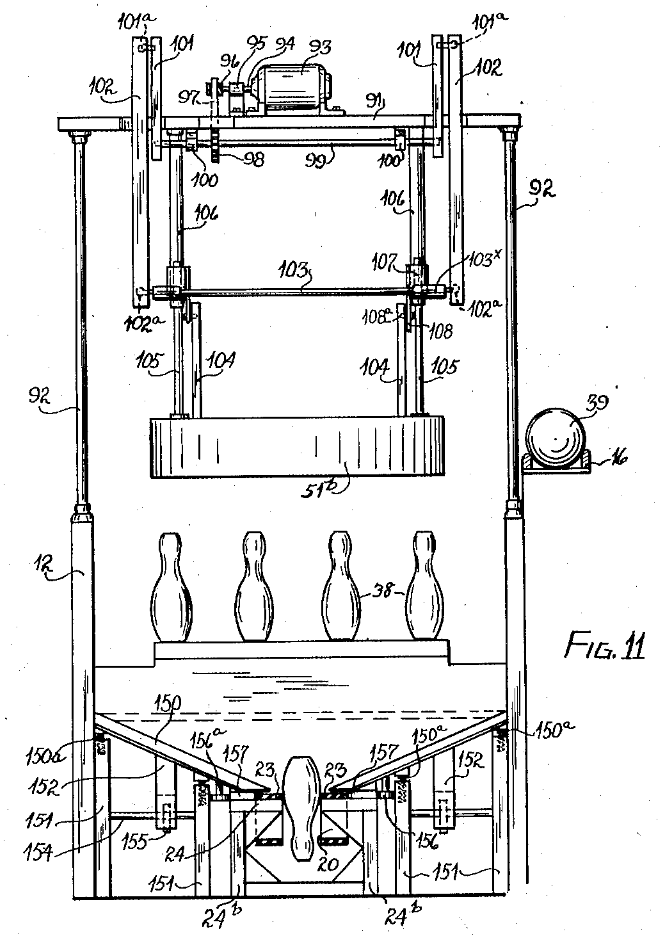
Figure 23:
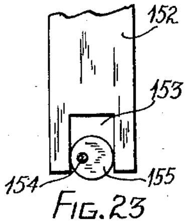
Figures 24, 25:
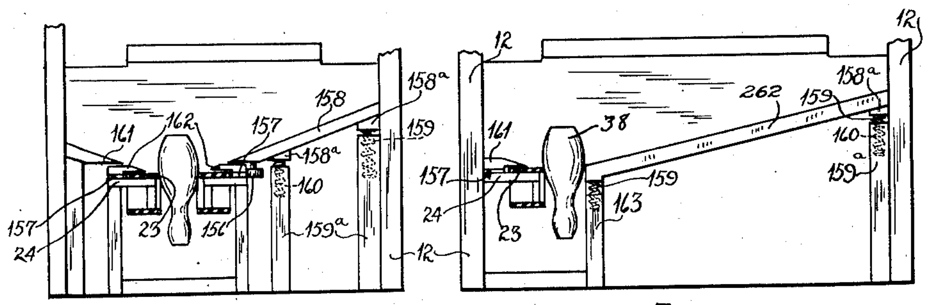
Figure 26:
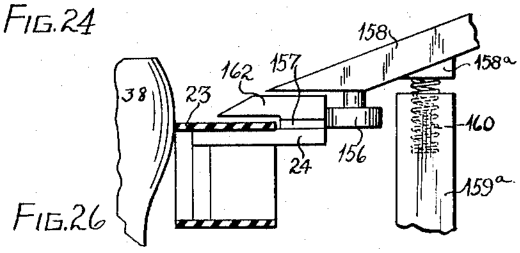
Figure 14:
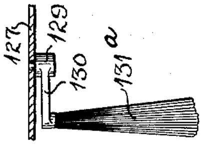
Figures 12, 13:
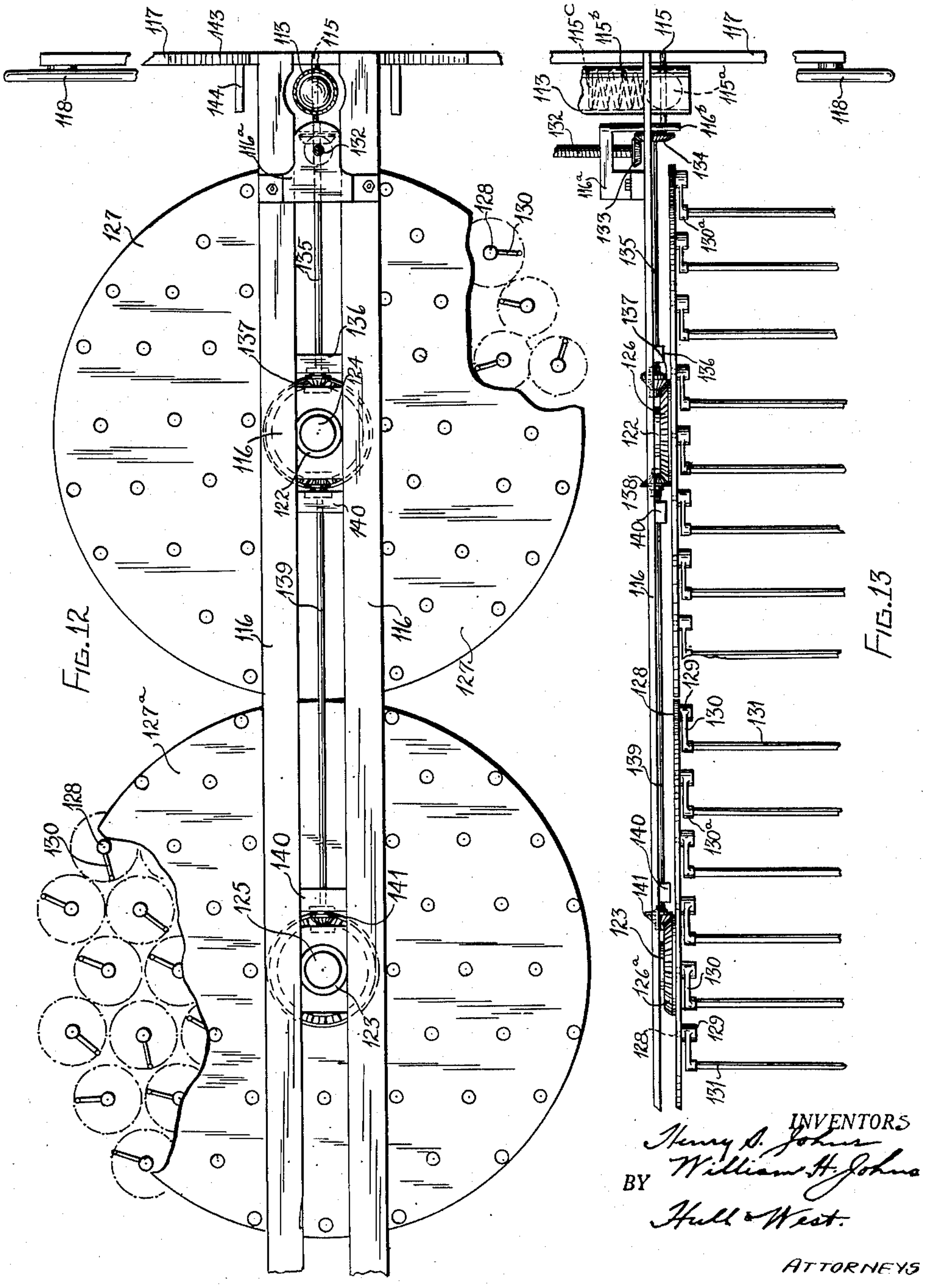
Figures 17, 18:
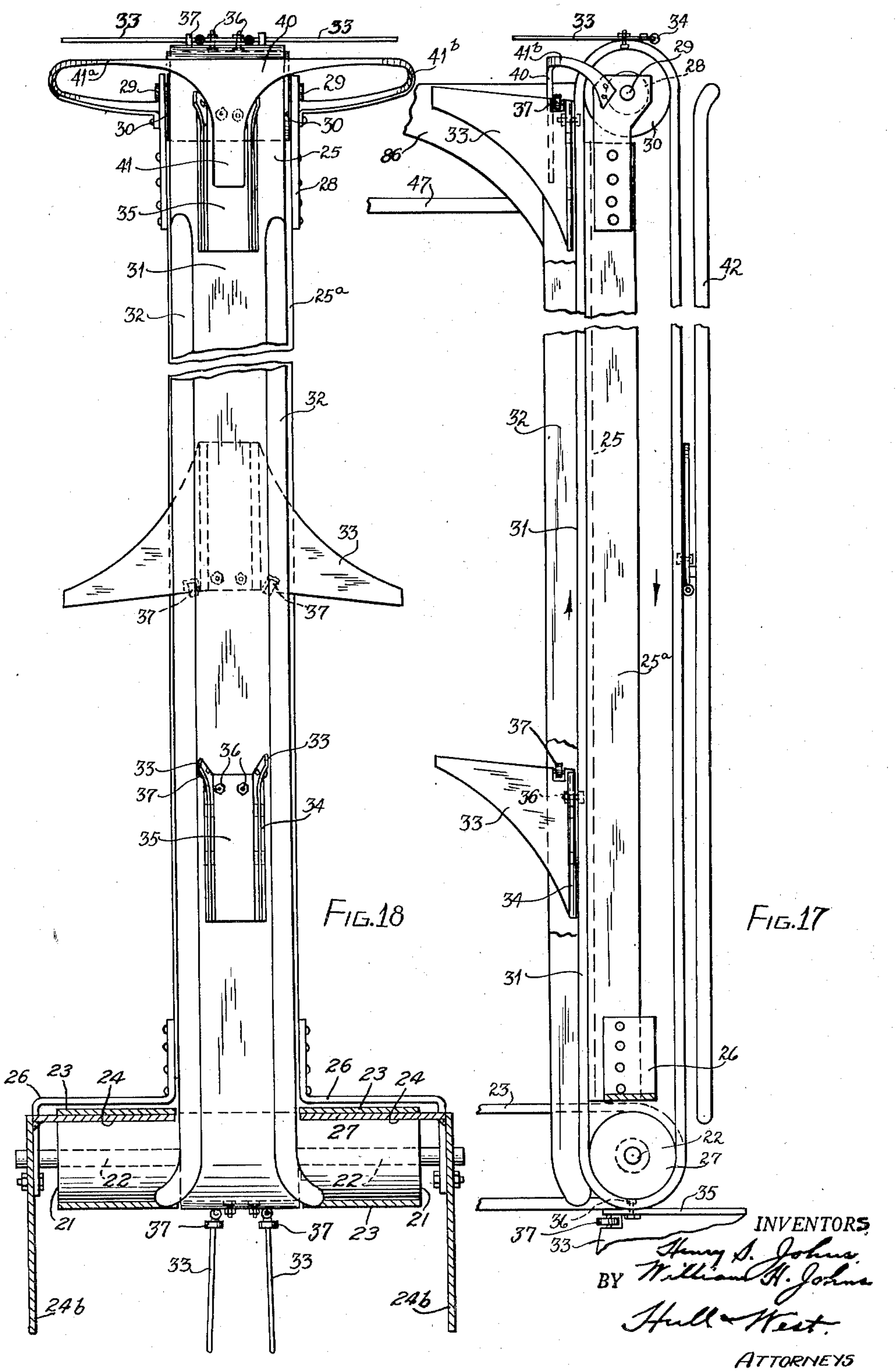
Figure 19:
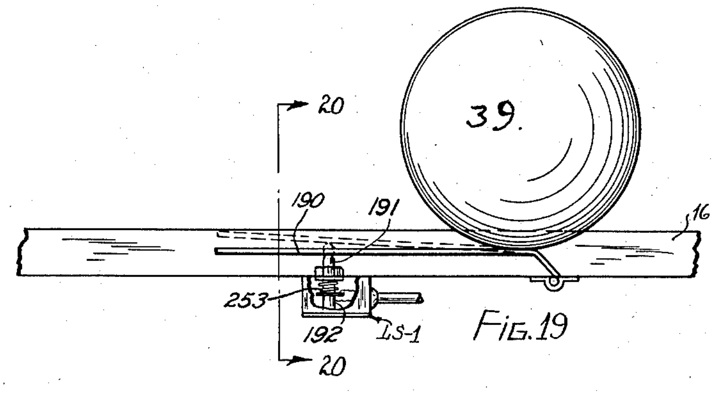
Figure 20:
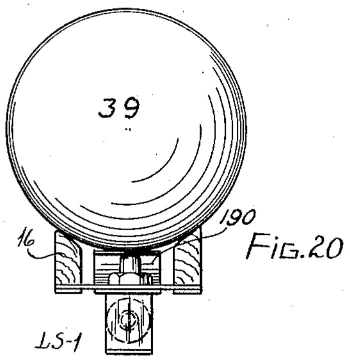
Figure 21:
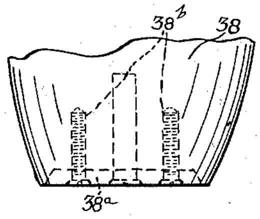
Figure 22:
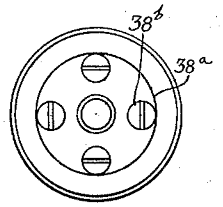
Figure 28:
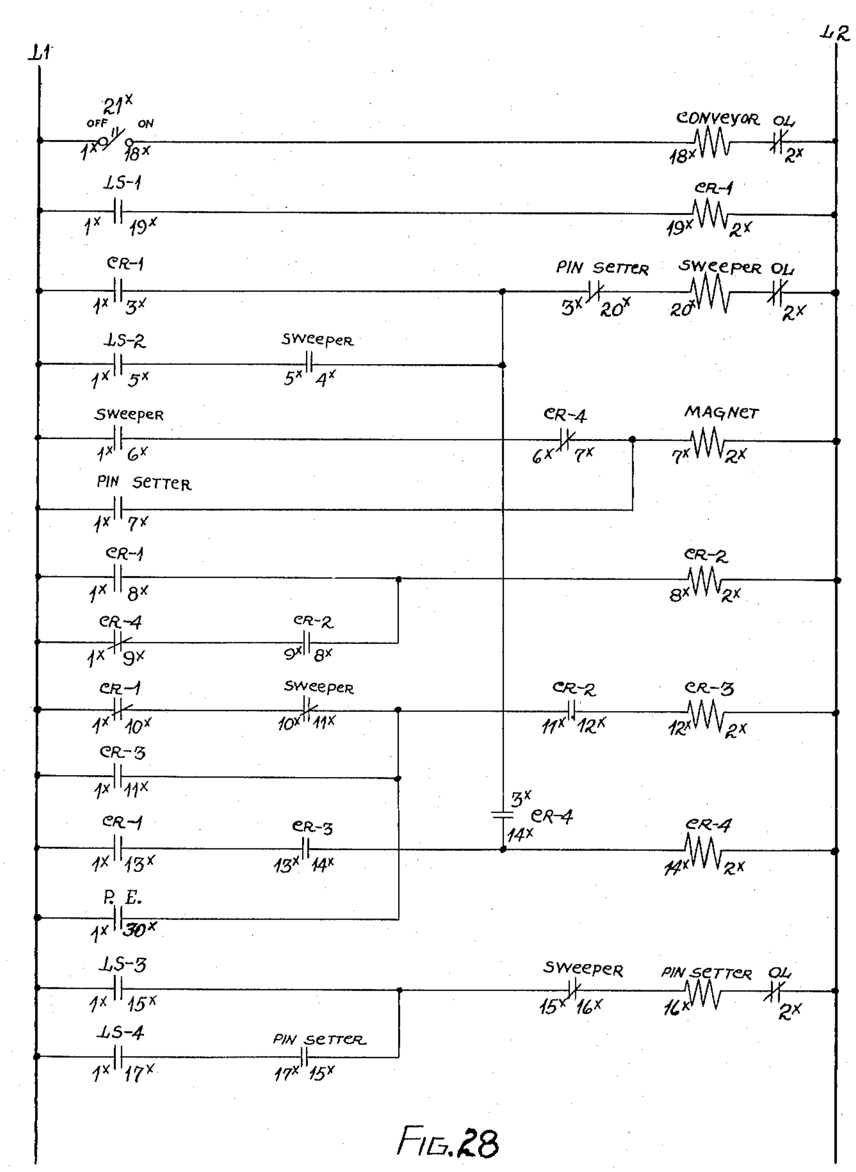

Further objects and advantages of the invention will be set forth in the following specification, when read in connection with the accompanying drawings which illustrates the present preferred embodiment thereof and wherein Fig. 1 represents a sectional side elevational view of our apparatus, certain parts being omitted for clearness of illustration; Fig. 2 is a sectional view of the apparatus shown in Fig. 1, the section being taken on the line 2—2 of Fig. 1 and showing in plan view the chutes for the pins and the pin setter, the positions of the said chutes, when not in use, being shown in broken lines, the arm which supports the distributor shaft being shown and the brackets and shaft for the front belt-pulleys being omitted; Fig. 3 is an enlarged sectional view taken substantially on the line 3—3 of Fig. 1, the elevator and its support being omitted; Fig. 4 is a detail in section corresponding approximately to the line 4—4 of Fig. 3, the outer casing wall 48 of the distributor being omitted; Fig. 5 is a view similar to Fig. 4 and showing the positions of the parts when a pin is being discharged from one of the sections of the distributor into a chute therebeneath; Fig. 6 is a sectional view taken similarly to Fig. 5 and showing the positions of the parts prior to the depression of a distributor door by the weight of a pin thereupon; Fig. 7 is a side elevational development of a portion of the distributor illustrated in Fig. 3, showing a door supported by one of the vertical members of the supporting ring; Fig. 8 is a view similar to Fig. 7, showing the positions of the parts when the door-supporting ring has reached a position wherein its travel is temporarily arrested and also showing one of the springs which connect the supporting ring and the guide ring; Fig. 9 is a view similar to Fig. 7, showing the manner in which the supporting ring is permitted to resume its travel after all of the pins of the distributor shall have been discharged into their respective chutes and also showing the position of one of the doors at this time; Fig. 10 is a detail in elevation showing the cam brake which serves to prevent excessive forward and backward movements of the distributor by the ratchet arm and pawl; Fig. 11 is a sectional view corresponding substantially to the line 11—11 of Fig. 1, the brush mechanism and certain other parts being omitted; Fig. 12 is a detail in plan, with parts broken away, of the brush mechanism employed for removing pins from the alley; Fig. 13 is a side elevational view of the brush mechanism shown in Fig. 12, the brackets and pins for limiting the rocking movements of the frame for said mechanism being omitted for clearness of illustration and the bottoms of the brush elements being broken away, and Fig. 14 is a detail in sectional elevation of a modification of the brush elements shown in Fig. 13; Fig. 15 is a perspective view of a portion of the alley including the kickbacks and showing also a portion of the pit and the electric eye installation through which the pin setter and the sweeping mechanism are operated in the event of a strike; Fig. 16 is a plan view showing the portions of the kickbacks equipped with the electric eye installation and also showing a modification of the arrangement of the electric eye means shown in the preceding view; Fig. 17 is a side elevational view of the elevator and its support, which elevator serves to raise the pins and balls from the pit, the belt and pulley on the near side and the distributor being omitted; Fig. 18 is a front elevational view of the elevator and its support shown in the preceding view which support is partly shown in section; Fig. 19 is a detail in side elevation of a portion of the return track, illustrating the means whereby the ball will operate the switch which causes the sweeper to operate for the purpose of clearing the alley of pins; Fig. 20 is a detail in section corresponding to the line 20—20 of Fig. 19; Fig. 21 is a side elevational view of the bottom portion of a bowling pin, and Fig. 22 is a plan view of the bottom of said bowling pin, showing the same as equipped with a magnetic plate; Fig. 23 is a detail in side elevation of part of the mechanism whereby longitudinal reciprocatory movement may be imparted to opposite sides of the inclined floor of the pit; Figs. 24 and 25 are details in section showing modifications of the pit and conveyor construction and arrangement; Fig. 26 is a sectional detail of the lower edge of one of the pit floor sections and the belt adjacent thereto; Fig. 27 is a sectional detail of a modification of the elevator belt and lifting fingers; Fig. 28 is an elementary diagram illustrating the wiring of the circuits employed for the operation of our apparatus.

Our apparatus as shown herein comprises generally a pit provided with a horizontal conveyor by means of which the pins and balls are carried to the rear of the pit and delivered onto a vertical conveyor from which the balls are discharged to the return track and the pins are delivered successively into the sections of a rotatable distributor and thence through chutes into a pin setter; also sweeping apparatus for removing all dead wood from the alley into the pit, following the bowling of a ball; also means for temporarily anchoring all pins which may be left standing after the bowling of a first ball other than a strike, and during the sweeping operation following such bowling; also an electrical means for automatically accomplishing all of the foregoing operations of our apparatus.

Describing by reference characters the various parts illustrated in the drawings, 10 denotes a front portion of the alley, 11 one of the gutters, 12 the kickbacks, the same being of the usual shape; 13 the pit, 14 the cushion, 15 a guide which depends from the return track and which protects the elevator and maintains the balls upon the fingers of the elevator. 17 denotes one of a pair of brackets which are secured to and project forwardly from a transverse partition 18 at the front of the pit and which brackets support a shaft 19 which in turn supports a pair of front pulleys 20 for the pit conveyor belts. The rear pulleys, one of which is indicated at 21, for the said belts are supported by a shaft 22, the ends of which are journaled in the lower end portions of the supports for the vertical member which backs up the ascending stretch of the vertical conveyor, to be described hereinafter. 23 denotes each of a pair of horizontal belts which are spaced apart a distance somewhat less than the maximum diameter of a pin, the rear portions passing around the pulleys 21. 24 denotes horizontal guide members for the upper stretches of the belts 23, the said guide members being supported on uprights $24^a$ and $24^b$.

25 denotes the web and $25^a$ the flanges of a vertically extending channel member which backs the ascending flight of the vertical conveyor belt, the lower end of each of the flanges being bolted to a metallic plate 26 which is bent outwardly at its lower end whereby it may engage the inner surface of the corresponding support $24^b$, the lower ends being extended outwardly and bolted to the vertical members $24^b$, as indicated at $26^a$.

The shaft 22 also supports the lower pulley 27 for the vertical conveyor (see Figs. 17 and 18) which pulley and conveyor are located between the inner edges of the belts 23 and between the pulleys 21. To the upper ends of the flanges $25^a$, brackets 28 are secured which provide journals for the shafts 29 for the upper pulley 30 of the vertical conveyor. A motor (not shown) drives this shaft and the shaft 22 for the horizontal conveyor belt is driven by the vertical conveyor belt.

The vertical conveyor comprises generally a belt 31 the side edges of the ascending stretch whereof have vertical guards 32 positioned thereadjacent (see Figs. 17 and 18). Lifting fingers 33 are connected at their bases by means of hinges 34 to base plates 35, the portion of each of said plates adjacent to the operating edges of said fingers being shown as secured to the belt as by means of bolts 36. These hinges are of a type well known to the art which limit the movement of the fingers 33 toward each other whereby, when mounted on the ascending stretch of the belt, they will be spread apart at their outer ends a sufficient distances to receive therebetween the pins delivered thereto by the horizontal conveyor and also to receive thereupon the balls also delivered thereto by the said horizontal conveyor.

Rollers 37 which are mounted within the upper and inner ends of the fingers engage the guards 32 and thus maintain the fingers in proper position to engage the pins 38 and balls 39 that are brought thereabove by the horizontal conveyor. 40 denotes a spreader which is located above the guards 32. It is generally of T-shape, having a stem 41 which is narrower than the base plate 35, the arms $41^a$ of the T being curved transversely and towards the rear of the apparatus and connected by curved extensions $41^b$ to the brackets 28 whereby, when the upper portions of the fingers 33 engage these curved surfaces, the fingers will be moved apart about their hinges and will pass over the top of the pulley 30 in a substantially horizontal plane, as shown at the tops of Figs. 1, 17 and 18, the fingers being retained in their out-spread position by gravity as they pass over the pulley 30 and thereafter being retained in outspread position by the guard 42. The descending stretch of the belt 31 passes between a guard 42 and the web 25, and the guard keeps the fingers 33 in the outspread position shown in Figs. 1, 17 and 18, thereby accommodating the vertical conveyor and the lifting fingers thereon to the space which would ordinarily be provided therefor at the rear of the pit and without the necessity for deepening the latter. As the descending stretch of the conveyor passes the lower end of the guard 42 and beneath the pulley 27, the fingers are free to drop and to assume their operating positions as they start again upon the ascent.

43 denotes deflector plates or brackets which are secured to the flanges $25^a$ and between which the fingers 33 pass, the said deflector plates or brackets having their lower edges curved whereby, when a ball encounters the same, it will be delivered by the fingers onto the rear end of the return track 16 shown in Figs. 1, 19 and 20.

The pins, which pass between the deflecting brackets 43, are delivered successively into the sections or compartments of a rotary distributor, whence they are in turn delivered into chutes and thence into the pin setter. The construction and arrangement of parts whereby these results are accomplished will now be described.

46 denotes a vertical shaft which is pivotally supported by means of an arm 47 pivotally secured to one of the flanges $25^a$. This shaft extends downwardly through the center of the distributor, the outer casing of which is indicated at 48, and is secured at its lower end to the center of a supporting plate 49 having openings 50 through which pins are directed from the distributor into the upper chute sections 51, the upper ends of which are secured to the bottom of the plate and in register with the openings 50 (see Figs. 1, 4, 5 and 6).

The distributor comprises the cylindrical external casing 48, a bottom wall 52 and a central upper wall 53 by means of which and the bottom wall the distributor is journaled for rotation upon the shaft 46. The body of the casing 48 projects above the wall 53, and ten pin-receiving sections or compartments are provided above the wall 52, these sections being shown as formed between radially outwardly extending wall 54 and vertical walls 55 which define the inner ends of the said sections or compartments and also constitute the inner walls of vertical passageways 56 through which pins delivered into the sections thereabove pass into the upper ends of the respective chutes.

Each upper receiving section, indicated at A, has an opening 57 in the portion of the wall 53 constituting the bottom thereof and the bottom wall 52 and the supporting plate 49 have registering openings 58 and 59, respectively, adapted to permit pins discharged into the passageway 56 to pass therethrough. The upper ends of the chute sections 51 are secured, as by means of clamping rings 61, to collars 60 surrounding the openings 59 and extending downwardly from the supporting plate 49.

62 denotes the horizontal flange and $62^a$ the vertical flange of a circular angular guide which is secured to the peripheral portion of the wall 52. Within this guide a supporting ring is carried by the wall 52. The wall 52 can be moved separately from the ring. This ring comprises a base portion 63 from which supporting members $63^a$ extend upwardly and each of which normally occupies a position below an upper receiving section A which enables it to support the swinging door 64 in the manner shown in Fig. 4, when a pin shall have been delivered onto said door. Each of these doors is pivotally supported on the outer portion of the wall 53 by means of a hinge 65 which is connected to the said wall and to the door and which is provided with a counterweight 66 adapted to lift each door to the position shown in Fig. 6 when no pin is resting thereupon. The members $63^a$ are spaced apart a distance sufficient to enable the same to be moved out of supporting relation to the doors 64 at the time when it is desired to discharge all of the pins from the sections A into the chute sections 51.

Springs 67 connect the base portion 63 of the supporting ring with a relatively fixed part of its support which may be the guide ring 62. 68 denotes angle levers which are pivoted to the base portion 63 of the supporting ring, as by pins, indicated at 69, each of which levers is provided at what will be referred to hereinafter as the "front" end of its front arm with a roller 70 and the front arm is also provided with an arm 71 extending upwardly therefrom and provided at its upper end with a roller 72. The rear arm of each lever is sufficiently heavier than the front arm and the vertical arm 71 to normally hold the vertical arm in the position shown at the left in Figs. 7–9; that is to say, with the roller 72 slightly above the top of its cooperating supporting member $63^a$, the weight of the rear arm being sufficient to retain the parts in these positions. The base 63 of the door supporting ring is provided with a slot 73 extending longitudinally of and adjacent to the bottom thereof. This slot is approximately of the same length as the distance between adjacent vertical supporting members $63^a$ and receives a pin 74 which projects thereinto from the vertical flange $62^a$ of the angular guide.

75 denotes a stop which is secured to and projects radially outwardly from the plate 49. This stop is located adjacent to the section A which receives the last of the series of ten pins delivered into the distributor when the distributor has been rotated by the ratchet-feed mechanism (to be described hereinafter) a sufficient distance to enable the ninth pin of said series to have been discharged into its appropriate section A. As the tenth pin of the series is moved upwardly by the elevator, it operates the ratchet-feed mechanism thereby to rotate the distributor a distance to bring the section for said pin into a position to receive the latter. Prior to this movement of the distributor, the first of the nine pins which have been already delivered to the distributor will have arrived at the position occupied by the pin-depressible door 64, shown in Fig. 7; and immediately after the initiation of this movement, the roller 70 will have engaged the stop 75, as shown in Fig. 8, thereby temporarily to arrest the movement of the supporting ring. Prior to any forward movement of the distributor with reference to the supporting ring, the tenth pin is delivered into its section and the forward movement of the distributor thereafter carries all of the doors 64 beyond their respective supporting members $63^a$; and all of said doors are then dropped by the weight of the pins thereupon, and the pins are discharged through the openings 58, 59 into their respective chute sections 51. The relative movement between the bottom wall 52 of the distributor and the door supporting ring is limited by the slot 73 and pin 74. Meanwhile, the distributor is about to be moved forwardly by its ratchet-feed, due to the upward movement of the first pin of the succeeding series of ten pins that are to be delivered into the sections A of the distributor. This movement of the distributor causes a release bar 76, carried by the bottom wall 52 of the distributor, to trip the lever the roller of which has engaged the stop 75, whereupon the springs 67 will operate to restore the said supporting ring to its original position in time for the first pin of the new series to be delivered into its section of the distributor. The length of the slot 73 is such as to prevent any overthrow movement of the said ring by the springs 67 when the roller on the front arm of the arresting lever is released from engagement with the stop 75. The pin 74 will occupy a position at the forward end of the slot 73 when the springs 67 are subjected to their maximum tension, which is when the doors have been carried beyond their supporting members $63^a$ and the release bar 76 is disengaging the roller 70 from the stop 75.

77 denotes a cam brake which is pivoted upon a pin 78 supported by the peripheral portion of the plate 49 and which engages beneath the peripheral portion of the bottom plate 52 of the distributor, the said cam brake being provided with a counterweight $77^a$ whereby it is held in such frictional contact with the said plate 52 as to prevent any excessive forward and backward movement of the distributor by the movements of the ratchet-feed, which will now be described.

Referring to Figs. 1 and 3, 79 denotes an arm which is pivoted upon the shaft 46 above the distributor. This arm is provided with a pawl 80 which is adapted, by movement of the arm 79 in the direction indicated by the arrow, to engage the tops of the radially extending vertical walls 54 therebeneath and to pass over the tops of the same by movement of the arm in the reverse direction. The outer end of this arm is pivotally connected to a link 81, the opposite end of which is connected with the upper end of an arm 82 the lower end of which is rigidly connected with a shaft 83 journaled in brackets, one of which is indicated at 84, said brackets being supported by the flanges $25^a$ of the channel backing for the conveyor 31. 85 denotes a curved arm, rigid with the said shaft and extending toward the adjacent stretch of the conveyor belt 31 in a position to be engaged by the bottoms of the pins as the latter are conducted therebeyond by the fingers 33. As each pin passes the arm 85, it moves the upper portion of the same in a direction to rock the shaft 83 and thereby to cause the upper end of the arm 82 to impart the necessary movement to the ratchet arm 79 to cause the distributor to be advanced a distance equal to the distance between adjacent walls 54. A pair of deflectors (one of which is shown at 86) are secured to the arm 47, or to a bracket arm secured thereto and are projected toward the belt 31. The outer ends of the deflectors are spaced apart a distance to enable them to be received between the pairs of fingers 33 and their lower edges are curved whereby they serve to deliver the ascending pins into the respective sections of the distributor.

The chutes by which the pins which are discharged from the distributor are delivered to the pin setter are discontinuous, the sections 51 which extend downwardly from the distributor being separated from the sections $51^a$ which extend upwardly a short distance from the pin setter. The purpose of making the chutes in two sections is to enable the distributor, with the upper sections of the chutes attached thereto, to be swung to one side (as indicated by its position as shown in broken lines on Fig. 2) when it may be desirable to use a bowling alley for tournament purposes, in which event the automatic pin setting apparatus will be dispensed with. The construction also enables the pin setter to be easily raised and lowered when necessary, by the power driven apparatus shown herein. Except for its equipment with the lower chute sections $51^a$, the pin setter $51^b$ will be such as constitutes standard equipment for bowling alleys.

The upper sections of the chutes are additionally supported from the plate 49 by means of a strap 87 encircling the lower portions of the said sections and having its ends connected to a bar 88, the opposite ends of which in turn are pivotally connected to the lower ends of links 89, the upper ends of which are pivoted to the plate 49. The plate 49 is also pivotally connected by an arm 90 to a bracket $25^b$ fastened to one of the flanges $25^a$ of the channeled backing for the conveyor belt 31 (see Fig. 2).

91 denotes a platform the opposite ends of which are supported by posts 92 having their lower ends resting upon the kickbacks 12. 93 denotes a motor the shaft 94 whereof is journaled in a bracket 95. The shaft is provided, adjacent to the bracket 95, with a small sprocket 96 which is connected by a chain 97 with a larger sprocket 98 on a shaft 99 which is journaled in hangers 100 depending from the platform 91 (see Figs. 1 and 11). Crank arms 101 are connected to opposite ends of the shaft 99 and their upper ends are connected by ball-and-socket joints $101^a$ with connecting rods 102, the lower ends of which are detachably connected, as by means of slots extending upwardly from the lower ends thereof and cotter pins $102^a$ extending therethrough, to the ends of a crossbar 103. One end of each of two links 104 for the pin-setter $51^b$ is indirectly connected to the crossbar 103, with each link also connecting to one side of the pin-setter. For the purpose of guiding the pin setter while being raised and lowered by the operation of the motor 93, rods 105 are secured to opposite sides of the pin setter, the said rods being slidable within tubes 106 secured to and depending from the platform 91. The lower portion of each of these tubes has a bracket 107 secured thereto to each of which brackets one end of an operating handle bar 108 is pivotally secured, the opposite end being pivotally secured to the cross bar 103. The upper end of each of the links 104 is pivotally connected to the adjacent handle bar below the cross bar, as shown at $108^a$. The cross bar is provided with handles $103^x$ by means of which it may be manipulated by hand, when the ends of the bar are disengaged from the links 102.

With the parts constructed and arranged as described, it is apparent that by rotation of the shaft 94, the pin setter $51^b$ may be lowered to spot and deposit pins upon the alley in the usual manner and be raised thereafter to bring the upper ends of the chute sections $51^a$ into registration with the lower ends of the chute sections 51. When it is desired to use the alley for tournament bowling, the lower ends of the connecting rods 102 will be disengaged from the transverse bar 103 and thereafter the pin setter may be raised and lowered in the ordinary manner by means of handles $103^x$ secured to the ends of the transverse bar 103.

For the purpose of removing the "dead wood" from the alley and gutters we provide a brushing mechanism shown more particularly in Figs. 1, 12 and 13, wherein 109 denotes a motor having a two-shaft reduction unit of a type well known to the art and wherein the shaft 110 is driven at motor speed and the shaft $110^a$ is driven by reduction gearing (not shown) from the shaft 110. Both shafts are journaled in brackets $110^b$ supported by opposite sides of the platform 91. Crank arms $110^c$ are rigidly connected to the shaft $110^a$, the outer end of each of these crank arms being pivotally connected to a link 111, the opposite end of which link in turn is pivotally connected to a bell-crank arm 112, secured to the upper end of the tubular lifting arm 113, mounted on a shaft $112^a$ which is supported by brackets $112^b$ rising from the platform 91.

116 denotes transverse members connecting the inverted U-shaped frames 117, each branch of each of said frames being provided at its lower end with a wheel 118 adapted to traverse a gutter 11. The axle 119 of each wheel has an arm 120 pivoted thereto, said arm having secured to the front end thereof a wiper 121, of rubber or similar material, which is adapted, by the movement of the wheels along the gutter to dislodge pins therefrom and deliver the same into the pit.

The frame comprising the members 116 supports bearings 122, 123 for the shafts 124, 125 of beveled gears 126, $126^a$, the bases of which gears are rigidly connected with circular plates 127, 127*a*, which in turn support the short stub shafts 128 which are mounted in and project from the bottoms of the plates 127, $127^a$, the said stub shafts constituting bearings for the journals 129 of crank arms 130 to which brush elements 131 are secured. These brush elements may be made of bamboo rods, as indicated on Fig. 13, or of tufts of stiff fibrous material, as indicated at $131^a$ on Fig. 14.

The power for rotating the plates 127, $127^a$ and causing the brush elements supported thereby to sweep the alleys of the "dead wood" left at the end of each bowling operation is conveniently supplied from the shaft 110 of the motor 109 through a flexible shaft 132 driven by and extending therefrom and provided at its lower end with a beveled pinion 133 meshing with a beveled pinion 134 on one end of a shaft 135 journaled in a bearing in the arm 116$^b$ and a bearing 136 mounted on the transverse members 116. The opposite end of the shaft 135 is provided with a beveled pinion 137 meshing with the beveled gear 126, and the said beveled gear in turn meshes with a beveled pinion 138 on the adjacent end of a shaft 139 which is journaled in bearings 140 supported by the transverse members 116, the opposite end of the said shaft being provided with a beveled pinion 141 meshing with the beveled gear 126$^a$. By this construction and arrangement, it will be apparent that the plates 127, 127$^a$ and the brushing assemblies supported thereby will be rotated in opposite directions by power applied to the respective beveled gears thereof. The lower end of each arm 113 is pivotally connected to the brushing mechanism proper, as by means of a ball 115$^a$ inserted through the end portion of the tubular arm 113 into the lower end thereof and a pin 115, which extends through a ball 115$^a$ with its opposite ends supported at the center of the top of the corresponding frame 117 and the lower end of the arm 116$^b$ of the bracket 116$^a$. The slots 115$^x$ facilitate axial movement of the sweeper means. The ball supports the lower end of a coiled spring 115$^b$, the upper end of which engages an abutment 115$^c$.

With the parts of the sweeping apparatus arranged and constructed as thus far described, its operation will be readily understood. The arms 113 are lowered by rotation of the shaft 110$^a$, whereby the crank arms 110$^c$ and the links 111 assume the positions shown in Fig. 1, the brushes meanwhile being rotated by the flexible shaft 132 which is driven, by suitable connections, from the shaft 110. The arms 113 and the frames 117 and the parts supported thereby will also assume the positions shown in Fig. 1, wherein the brushes and the wipers 121 are located a sufficient distance from the pit to enable them to encounter all of the dead wood, while being moved from these positions toward the pit. During this movement, pins that may have been left standing are retained in their respective positions by means to be described hereinafter. With the plates 127 and 127$^a$ and the wheeled supporting frames 117 positioned as shown and with the plates rotating through the action of the flexible shaft 132 and the driving connections heretofore described, said frames and the parts supported thereby will be moved toward the pit 13 by the arms 113, and all dead wood on the floor of the alley and in the gutters will be delivered into the pit before the transverse members 116 and the parts supported thereby are lifted above the kickbacks and to the position indicated in dotted lines in Fig. 1. During the foregoing movements, the springs 115$^b$ are compressed to provide adjustment in the radial distances between the ends of the arms 113 and the tops of the frames 117. Further rotation of the shaft 110$^a$ will cause the arms 113 and the parts attached thereto to be lifted and swung to the dotted line positions shown in Fig. 1, at which time the limit switch which controls the motor 109 will be opened. The lifting arm 113 may require a bracket 300 thereon for contacting the limit switch LS-2 in the raised position of the arm to hold such switch open at that time.

In order to prevent the brushes from changing the positions of any pins that may be left standing after bowling one ball of a bowling frame, we provide the following construction: 142 denotes an electromagnetic plate which extends the full width of the floor of the alley and a sufficient distance from the front of the pit to form a support for all pins which may be left standing after bowling the first ball of a frame. This plate may be energized and de-energized by any means known to the electromagnet art, such means, for instance, as are used in workshops for holding work and such as are used in connection with lifting magnets and including current controlling means to be discussed hereinafter. This plate is energized in advance of the operation of the sweeper and thus holds all pins which are left standing firmly anchored thereto by means of magnetic plates 38$^a$ secured to the bottoms of the pins 38 by screws 38$^b$—see Figs. 21 and 22.

The mounting of the brush elements on crank arms enables these elements to move around any standing pins which they may encounter and they are of sufficient length to enable them to yield, without breaking off in or adjacent to their sockets 130$^a$, should they temporarily encounter a pin on "dead center." At the end of the sweeping operation and when the brushes have been lifted sufficiently to clear the tops of any standing pins, the magnetic plate will be deenergized, as will be explained hereinafter.

Each of the frames 117 has secured thereto brackets 143, each having a rod or arm 144 secured thereto and adapted to engage the arm 113 adjacent thereto, thereby to limit the rotary movements of these frames about their pivot pins 115, when the said frames and the parts supported thereby are elevated.

The current whereby the motor 109 is operated is controlled in part by means of mirrors and electric eyes. These mirrors, 147, are set into the kickbacks and are of sufficient length to extend from a point above the front of the pit to a point beyond that on which the No. 1 pin is spotted, whereby a pin which might be left standing in a position in advance of the No. 1 spot will be interposed between the front portions of the said mirrors. It will be noted that these mirrors are located a distance above the floor of the alley such that no part of a fallen pin will be within a plane which includes the lower edges of the mirrors. The mirrors may be made of any suitable material, such as stainless steel, capable of withstanding usage. In practice, the mirrors may be set from 9 to 10 inches above and parallel with the alley floor for tenpin bowling. One or more electric eyes, indicated at 148, are shown as installed at each end of one mirror and the lamps for illuminating the said eyes are shown as installed at the middle of the opposite mirror, as indicated at 149 on Fig. 15; or the positions of the lamps and the electric eyes may be reversed, as shown in Fig. 16, wherein the electric eyes 148 are indicated as positioned at the middle of one of the mirrors and the lamps 149 at the ends of the opposite mirror.

The lamps are so positioned that the beams emitted therefrom will each make an angle of approximately 1° 33″ with a vertical plane intersecting the said mirrors at right angles to the inner surfaces thereof. This will not only insure that any pin which may be standing will intercept a beam of light while being reflected back and forth by and between the mirrors, but will shorten the distance which the reflected beams must travel between their respective points of origin and the eyes with which they respectively cooperate so as to render the said eyes capable of performing their functions, since the angle given is the maximum angle of advance at which a light beam can be reflected back and forth across the alley and still be certain to strike a pin standing on the alley; it being noted that the mirrors are preferably about 42″ long, in order to include, between planes extending transversely of the alley and engaging their front and rear ends, any and all pins that may be standing. The circuit controlled by the electric eye is normally open when any pin is standing and the pin sweeper motor is actuated by the ball return, as is the energization means of the magnetic plate, in the usual manner. If a pin is standing on the alley after one ball is thrown in one frame, the magnetic plate is energized by the sweeper contacts $1^x$ and $6^x$ whenever the sweeper is in operation. Pinsetter contacts $1^x$ and $7^x$ always close an energization circuit for the magnetic plate when the pinsetter is operating. If none of the beams of the electric eye is intercepted by a standing pin i. e. a strike has been made, or a spare has been secured, the circuit to the magnetic plate will be closed by the action of the photo-electric cell contacts closing to complete the circuit for CR–3 when CR–1 is still closed. Such closure of control relay CR–3 provides an energization circuit for control relay CR–4, the opening of which opens the circuit to the magnetic plate and facilitates the sweeping of pins from the alley.

In order to facilitate the discharge of pins and balls upon the horizontal conveyor, the inner and outer edge portions of each of the sloping floor sections 150 of the pit may be supported by springs $150^a$ having their lower ends supported by uprights 151. 152 denotes legs which are secured to and depend from the bottoms of the floor sections and each of which is provided at its lower end with an upwardly extending slot 153 through which there extends a shaft 154, the said shaft being journaled in the uprights 151. Mounted on the shaft is a cam 155 which, by rotation of the shaft is adapted to impart fore-and-aft oscillations to the floor sections thereabove. These shafts may be driven, either by a special motor provided therefor or from the motor which operates the conveyors. Rollers 156 are mounted on shafts $156^a$ depending from the lower portions of the floor sections and are adapted to engage the strips 157 which back up the side edges of the belts 23 and prevent them from spreading.

In Fig. 24 there is shown a modification of the construction of the pit and horizontal conveyor wherein, instead of having the horizontal conveyor located midway between the sides of the pit, it is located adjacent to one of the sides thereof, the opposite side being provided with an extended inclined floor 158 which is supported by coiled springs 159 engaging short studs $158^a$ with their upper ends, their lower ends projecting into recesses 160 provided therefor in vertical members $159^a$. The outer edge of the conveyor belt 23 on the opposite side from the floor 158 is adjacent a short floor section 161 extending from the adjacent side of the pit. In Fig. 11, the inner edges of the floor sections 150 overhang the adjacent sides of the belts and hold the same down. In Fig. 24, separate hold-down strips 162 are provided, as well as the backing strips 157. Owing to the proximity of one of the belts of the conveyor to one of the sides of the pit, any pins and balls which may be delivered against or adjacent to the said side will be delivered onto the belt adjacent thereto while any balls or pins which may be delivered upon the extended floor section 158 will be delivered onto the conveyor belt adjacent thereto, such delivery being facilitated by the spring mounting of the said section.

In Fig. 25 we have illustrated the manner in which the balls and pins may be delivered to the vertical conveyor by means of a single horizontal belt. In this modification, the conveyor is located adjacent to one side of the pit and is overhung by the short floor section 161. Here, however, only one belt 23 is employed and, in lieu of the second belt, the extended inclined floor section 262 is supported at both ends by springs 159 interposed between the same and vertical supports $159^a$ and 163, the bottom edge of the inclined surface of the extended floor section being in the same horizontal plane as the top of the upper stretch of the belt 23. Pins and balls which are delivered into the space between the upper stretch of the belt 23 and the lower end of the platform 262 will be conducted, by movement of the belt, to the position wherein they will be delivered to the vertical stretch of the elevating conveyor that will be positioned in alignment with the opening between the belt 23 and floor section 262.

In Fig. 26 there is shown an enlarged detail of one of the belts 23 and the location of a back-up strip 157 and a hold-down strip 162. The element 158 has no oscillating member provided therefor but limited movement occurs in same by virtue of the spring mounting thereof whereby the roller 156 provides a stop to control such movement of the element 153.

In Fig. 27 there is shown in section a modification of the ascending stretch of the vertical conveyor and its channeled backing wherein the belt proper and the vertical guards for the side edges are of substantially the same construction as the correspondingly designated parts in the vertical conveyor shown in the preceding views, the vertical guards being shown as conveniently made in two parts, 32, $32^a$, the parts 32 engaging the side edges of the belt and the parts $32^a$ overhanging the side edges. In this construction, however, the lifting fingers $33^a$ are formed integrally with a base $33^b$, and this base is shown as fastened to the belt by bolts $36^a$.

With the parts constructed and arranged as thus far described, the general operation is as follows: By means of a switch conveniently accessible to a bowler or to one of the personnel operating the alley, the pit and elevating conveyors are put into operation. The bowler delivers the first ball, which may leave one or more pins standing. The ball and the pins will be delivered by the sloping sides of the pit onto the horizontal conveyor and thence onto the lifting fingers of the vertical conveyor, the ball being in turn deposited upon the return track while the pins are being delivered into the distributor. As the ball traverses the return track, it passes over the arm 190 of the limit switch LS–1 (see Figs. 1 and 19) which arm, being depressed, closes a circuit through contacts 191 and 192, against the action of a spring 253 which tends normally to separate the contacts and to elevate the arm 190 to the position indicated by broken lines. The closing of this circuit results in supplying current through a second circuit which includes a limit switch LS–2 and which operates the motor 109, thereby to rotate the brushes and lower the sweeping apparatus to the position shown in full lines in Fig. 1 and to complete the operation of said apparatus, the switch arm 190 being of sufficient length to enable the second circuit to be closed before the initial circuit closed thereby is opened by the return ball passing from the switch arm 190 and releasing same. As the sweeping apparatus is descending, current is also supplied through this second circuit to the magnetic plate, which then holds tightly all pins that have been left standing. The rotating brushes and the pushers remove all of the dead wood from the floor and gutters into the pit and the brushing apparatus is then swung to the position indicated in broken lines, at which time the current is cut off from the brushing mechanism and from the magnetic plate by the bracket 300 encountering the switch blade of the limit switch LS-2. The ball has meanwhile returned to the bowler, who bowls for the second time, knocking down one or more or none of the pins which have been left standing. As the ball is returned along the track, it operates as before through the switch LS-1 to close a portion of the second circuit whereby the brushing mechanism will be operated as before, but to cut out the portion which supplies current to the magnetic plate, so that all of the pins that may be left are swept into the pit. In the case of a strike being made, the electric eyes operate in conjunction with the limit switch LS-1 to close the portion of the second circuit by which the brushing operation is effected while cutting out the portion which supplies current to the magnetic plate. The elevator delivers the pins into the distributor and the latter operates as set forth hereinbefore to deliver all of the pins into the chute sections 51 and thence into the pin setter. The longest of the chute sections is provided with a limit switch LS-3 which, as the pin passes over the same, operates to close a circuit which starts the motor 93 in operation, causing the pin setter to be lowered in a manner similar to that accomplished by hand operation thereof and also to close a circuit which supplies electric current to the magnetic plate whereby it will hold in position all of the pins that have been delivered thereupon from the pin setter. Further rotation of the shaft of the motor 93 will lift the pin setter to the position shown in Fig. 1 and, through the limit switch indicated at LS-4 will break the motor circuit and also the circuit to the magnetic plate. The ball is meanwhile returned to the bowler and he is ready to bowl his next frame.

The elementary wiring diagram whereby the foregoing automatic operations are accomplished is shown in Fig. 28, wherein CR-1, CR-2, CR-3 and CR-4 represent control relays; PE represents contacts of a photoelectric relay, closed when the light is not obstructed; and OL represents the overload relay contacts of the motor starters. LS-1 represents a limit switch which is normally open, but which closes when the ball passes on its return, and which must remain closed until LS-2 is closed; LS-2 represents a limit switch which is normally open (being held open by the bracket 300 when the sweeping apparatus is in its inoperative position), but which closes when the sweeper starts down and remains closed until the sweeper returns to the starting position; LS-3 represents a limit switch which is normally open, but which closes momentarily when a pin traveling in the longest chute approaches the pin setter, after the pins are discharged from the distributor; LS-4 represents a limit switch which is held open when the pin setter is in its inoperative position; and which closes when the pin setter starts down and opens when the pin setter returns to its up position. This limit switch LS-4 is a spring type of switch that holds the circuits to the pin setter motor closed after such motor is once started. The spring normally urges this switch to a closed position but in the inoperative position of the pinsetter the control arm of the switch is held open by suitable means (not shown). The limit switches are shown in their positions at the start of the cycle of operation.

Referring to the aforesaid diagram, the closing of the on and off main switch No. 21x making contact between 1x and 18x energizes the conveyor and elevator motor starter to operate the conveyor and elevator continuously during the bowling game.

The first ball bowled is picked up by the conveyor and elevated to the return track and on its return the ball passes over limit switch LS-1 closing its contacts 1x and 19x. This limit switch is so constructed that its contacts are held in a closed position, due to the weight of the ball passing thereover, for a period of time sufficient to enable the energizing of the control relay CR-1 and the closing of LS-2. The control relay CR-1 being energized, closes contacts 1x and 3x and, as the pin setter contacts 3x and 20x are normally closed, the sweeper motor starter will be energized; also the contacts 1x and 8x of CR-1 relay will energize CR-2 relay control. The sweeper starter closing its contacts 5x and 4x closes a maintenance energization circuit for the sweeper through the LS-2 contacts 1x and 5x to maintain it in operation after contacts 1x and 3x have been opened by control relay CR-1, and maintains the sweeper in operation and closes the holding circuit for the sweeper motor through limit switch LS-2 contacts 1x and 5x which closes before limit switch LS-1 opens. LS-2 closes as soon as the sweeper starts to operate, and limit switch LS-1 may and does open after LS-2 has been closed. The sweeper contacts 1x and 6x are closed by the start of the sweeper and through the normally closed contacts 6x and 7x of CR-4 will energize the magnet. The sweeper will then make a complete operation and return to its starting position at which time LS-2 contacts 1x and 5x will open, stopping the sweeper. When the sweeper contacts open, the magnet will be deenergized by the opening of the sweeper contacts 1x and 6x.

The circuit is now ready for the bowling of the second ball. Return of the first ball along the return apparatus of the invention results in the energization of control relay CR-3, but control relay CR-4 is not then energized inasmuch as the energization circuit for control relay CR-4 requires that CR-1 be closed to close contacts 1x and 13x in the energization circuit of this relay. CR-1 must be open when CR-3 is initially energized. CR-1 is only again energized by the passage of a second ball through the ball return apparatus in a given frame of operation of the bowling apparatus of the invention. CR-4 thus can only be energized by the second energization of CR-1 in an operative cycle of the apparatus.

When the second ball passes limit switch LS-1, CR-1 relay is again energized and starts the sweeper. Regarding the control circuit change for a second ball returned in a frame, it should be noted that CR-3 relay was picked up through the CR-2 contacts 11x and 12x and the normally closed contacts of the sweeper 10x and 11x which closed when the sweeper stopped at its rest position after its first pass. CR-2 remains energized from the return of the first ball until the second ball's return energizes CR-4 and contacts 1x and 9x are opened. CR-1 contacts 1x and 13x will now energize CR-4 relay through the CR-3 contacts 13x and 14x and CR-4 relay will pick up and be maintained energized through its normally open contacts 14x and 3x and through sweeper contacts $4^x$ and $5^x$ and LS–2 limit switch contacts $1^x$ and $5^x$ as long as such switch LS–2 is closed. CR–4 relay, when picked up, opens its normally closed contacts $6^x$ and $7^x$ which will prevent the magnet from being energized. CR–4 contacts $1^x$ and $9^x$ also open and deenergize CR–2 relay. CR–2 relay drops out, opens its contacts $11^x$ and $12^x$ de-energizing CR–3 relay and resetting the circuit for the bowling of the next frame.

When the sweeper returns to its rest position, LS–2 limit switch opens, its contacts $1^x$ and $5^x$ dropping out CR–4 relay.

Should the first ball be a strike, the photoelectric relay contacts $1^x$ and $30^x$ will close and when the ball passes LS–1 limit switch, it will energize CR–1 and pick up CR–2 relay through contacts $1^x$ and $8^x$. CR–2 contacts $11^x$ and $12^x$ will then be closed and will pick up CR–3 relay which immediately will energize CR–4 relay through contacts $1^x$ and $13^x$ and $13^x$ and $14^x$ and which will maintain energized through the normally open contacts $14^x$ and $3^x$, the sweeper contacts $4^x$ and $5^x$ and the limit switch contacts $1^x$ and $5^x$. CR–4 contacts $6^x$ and $7^x$ will then open and prevent the magnet from being energized. The energizing of the CR–4 relay will reset the circuit for the next bowler.

The operation of the pin setter will be controlled by the limit switch LS–3 which closes its contacts $1^x$ and $15^x$ when the pin in the longest tube to the pin setter passes by it. When the pin setter is energized it will also close its contacts $1^x$ and $7^x$ which will energize the magnet for the complete period of time that the pin setter travels. Pin setter contacts $17^x$ and $15^x$ will seal in the pin setter control circuit through limit switch LS–4 contacts $1^x$ and $17^x$ which close before limit switch LS–3 contacts $1^x$ and $15^x$ open. When the pin setter returns to its up position limit switch LS–4 contacts $1^x$ and $17^x$ open to stop the pin setter.

The pin setter contacts $3^x$ and $20^x$ prevent the sweeper from being energized at any time while the pin setter is in motion and the sweeper contacts $15^x$ and $16^x$ prevent the pin setter from moving while the sweeper is in motion.

In our copending divisional applications Serial Nos. 150,361 and 150,362 we have covered the "pin retaining means for bowling alleys" and "photoelectric cell control for bowling alleys" shown and disclosed herein, which applications were filed March 18, 1950. The first of these divisional applications particularly covers the electro-magnetic plate disclosed in the present application for retaining standing pins on a bowling alley, and the second of these applications is primarily directed towards an electric circuit control means including an electric eye actuated circuit controlled by any standing pins on a bowling alley.

It is possible that in some instances the bracket arm 300 used to actuate or control LS–2 might become bent or otherwise be altered so that limit switch LS–2 might be actuated when the sweeper is not in operation. Hence the sweeper contacts $5^x$ and $4^x$ provide an auxiliary safety control switch in such circuit to prevent closing this circuit until the sweeper is definitely in operation.

Having thus described our invention, what we claim is:

1. In an apparatus for the automatic handling of balls and pins in a bowling alley comprising a pit, which apparatus includes means for sweeping dead wood into said pit, said means comprising frames having supports at the lower ends thereof adapted to ride upon the bottoms of the gutters, a cross frame connecting the top portions of the first mentioned frames, plates rotatably supported by the cross frame for movement in a substantially horizontal plane, brush elements depending from the said plates, means for rotating the said plates, and means for moving the brush assembly comprising the aforesaid frames and elements along the alley toward the pit to engage the brushes with any fallen pins thereby to deliver the pins into said pit, and for thereafter removing the assembly from the active portion of the alley.

2. In an apparatus for the automatic handling of balls and pins in a bowling alley comprising a pit, which apparatus includes means for sweeping dead wood into said pit, said means comprising inverted U-shaped frames having supports at the lower ends thereof adapted to ride upon the bottoms of the gutters, and wiping elements mounted in front of said supports for removing dead wood from the gutters, a cross frame connecting the top portions of the first mentioned frames, plates rotatably supported by the cross frame for movement in a substantially horizontal plane, brush elements depending from the said plates a sufficient distance to engage fallen pins on the alley, means for rotating the said plates, and means for moving the brush assembly comprising the aforesaid frames and elements along the alley toward the pit thereby to deliver the pins into said pit, and means for thereafter removing the brush assembly to a position above the active portion of the alley.

3. In the apparatus set forth in claim 2, the means for rotating the plates also causing the plates to be rotated in reverse directions, and the means for supporting the brush elements from each of the plates comprising crank arms each pivotally connected at one end to a plate and supporting a brush element at its opposite end.

4. In the apparatus recited in claim 1, the means for moving the brush assembly comprising arms pivotally connected at their lower ends to the first-named frames, a shaft connected to the upper ends of said arms for moving the first-named frames and the parts connected thereto through an arcuate path, brackets extending upwardly from each of said first-named frames, and an arm secured to and extending from each bracket in a direction to be brought into engagement with the adjacent lifting arm due to the pivotal movement of the said first-named frames with respect to the lower ends of their respective lifting arms.

5. In an apparatus for the automatic handling of balls or pins in a bowling alley comprising a floor, gutters, and a pit, which apparatus includes means for removing dead wood from the floor and gutters into said pit, the said means comprising a pair of frames each having supports at the lower ends thereof adapted to traverse a gutter, a shaft, arms connected at their upper ends to said shaft and at their lower ends to the upper ends of the aforesaid frames, rotatable brushing elements supported by and between the said frames, said brush elements extending to a point adjacent the alley and adapted by their rotation and by the movement of the frames toward the pit to remove dead wood into the latter, means for driving the said shaft thereby to swing the lower ends of the said arms along the alley toward the pit, and a motor for rotating said brushing elements.

6. In the apparatus set forth in claim 5, the lower end of each arm being tubular and the means for connecting the lower end of each arm to the corresponding inverted U-shaped frame comprising a bracket spaced inwardly from the frame, a ball within the lower end of the arm, a pin supporting said ball and having its ends extending through slots in the lower end of said arm and journaled respectively in the frame and the bracket spaced from the latter and a spring in the lower portion of each arm having its lower end engaged by the ball therein and its upper end bearing against an abutment in said arm.

7. In an apparatus for the automatic handling of balls and pins in a bowling alley having a pit, and gutters, which apparatus comprises means for sweeping dead wood into the pit, said means comprising a frame, plates rotatably supported by the said frame for movement in a substantially horizontal plane, a plurality of crank arms each of which is pivotally engaged adjacent one end thereof with one of said plates, brush elements depending from the free ends of said crank arms, means for rotating the said plates and means for moving the brush assembly comprising the aforesaid frame and elements along the alley toward the pit to engage the brushes with any fallen pins thereby to deliver the pins into the pit, and for thereafter removing the assembly from the active portion of the alley.

8. In an apparatus for the automatic handling of balls and pins in a bowling alley including a pit and gutters, which apparatus comprises means for sweeping dead wood into the pit, said means comprising a frame, plates rotatably supported by said frame for movement in a substantially horizontal plane, brush elements depending from the said plates, said brush elements being rotatably carried by said plates and extending to a point adjacent the alley when the apparatus is operatively positioned, means for rotating the said plates, and means for moving the brush assembly comprising the aforesaid frame and elements along the alley toward the pit to engage the brushes with any fallen pins thereby to deliver the pins into the pit, and for thereafter removing the assembly from the active portion of the alley.

HENRY S. JOHNS.
WILLIAM H. JOHNS.

REFERENCES CITED

The following references are of record in the file of this patent:

UNITED STATES PATENTS

| Number | Name | Date |
|---|---|---|
| 1,181,649 | Downey | May 2, 1916 |
| 1,573,643 | Proch | Feb. 16, 1926 |
| 1,615,064 | Bishop | Jan. 18, 1927 |
| 1,692,796 | Bishop | Nov. 20, 1928 |
| 1,896,383 | White | Feb. 7, 1933 |
| 2,014,306 | Barker | Sept. 10, 1935 |
| 2,037,671 | Yannes | Apr. 14, 1936 |
| 2,316,183 | Patterson | Apr. 13, 1943 |
| 2,319,925 | Flanagan | May 25, 1943 |
| 2,341,475 | Parra et al. | Feb. 8, 1944 |
| 2,341,476 | Parra et al. | Feb. 8, 1944 |
| 2,361,233 | Parra et al. | Oct. 24, 1944 |
| 2,411,348 | Turner | Nov. 19, 1946 |